Figure 1:
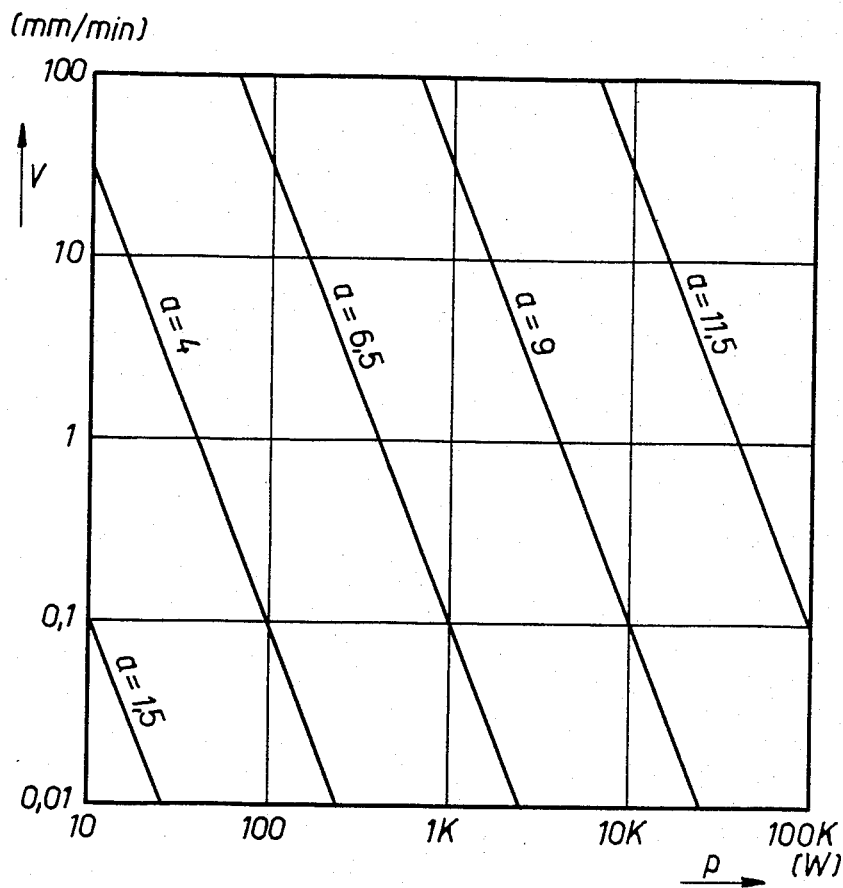

United States Patent [19]

Bühler

[11] Patent Number: 4,533,811
[45] Date of Patent: Aug. 6, 1985

[54] METHOD FOR AUTOMATIC PROCESS CONTROL IN SPARK EROSIVE MACHINING

[75] Inventor: Ernst Bühler, Losone, Switzerland

[73] Assignee: AG fur industrielle Elektronik AGIE Losone b. Locarno, Losone, Switzerland

[21] Appl. No.: 420,230

[22] PCT Filed: Jan. 12, 1982

[86] PCT No.: PCT/CH82/00002
§ 371 Date: Sep. 2, 1982
§ 102(e) Date: Sep. 2, 1982

[87] PCT Pub. No.: WO82/02353
PCT Pub. Date: Jul. 22, 1982

[30] Foreign Application Priority Data

Jan. 13, 1981 [CH] Switzerland .................. 190/81

[51] Int. Cl.³ .................................................. B23P 1/08
[52] U.S. Cl. .............................. 219/69 M; 219/69 C; 219/69 G
[58] Field of Search ............... 219/69 R, 69 G, 69 M, 219/69 S, 69 C

[56] References Cited

U.S. PATENT DOCUMENTS

| | | | |
|---|---|---|---|
| 3,987,269 | 10/1976 | Inoue et al. | 219/69 M |
| 4,071,729 | 1/1978 | Bell | 219/69 C |
| 4,296,302 | 10/1981 | Bell, Jr. et al. | 219/69 G |
| 4,361,745 | 11/1982 | Rupert et al. | 219/69 G |

FOREIGN PATENT DOCUMENTS

| | | |
|---|---|---|
| 2505944 | 12/1977 | Fed. Rep. of Germany . |
| 2211322 | 7/1974 | France . |
| 2443712 | 4/1980 | France . |
| 53-131598 | 11/1978 | Japan . |
| 525061 | 2/1970 | Switzerland . |
| 2041574 | 9/1980 | United Kingdom . |

Primary Examiner—M. H. Paschall
Attorney, Agent, or Firm—Neuman, Williams, Anderson & Olson

[57] ABSTRACT

The invention describes methods and means for optimum process control in spark erosive machining when there are considerable changes to the machining surface. By following a mathematically described process control strategy, it is possible to work in all spark erosion machining ranges without any interventions in the process control on the part of the operator.

14 Claims, 7 Drawing Figures $$a = \log V + 2{,}5 \log p$$

$$V = 10^{(a - 2{,}5 \log P)}$$

$$p = 10^{(\frac{a - \log V}{2{,}5})}$$

METHOD FOR AUTOMATIC PROCESS CONTROL IN SPARK EROSIVE MACHINING

The invention relates to a method for automatic process control in spark erosive machining under widely varying process conditions caused by large machining surface changes. The method and the means used for it can be used in all fields of spark erosive machining. They are of particular interest in connection with spark erosive countersinking of three-dimensional shapes with superimposed planetary movement, as well as in the spark erosive taper or conical cutting and spark erosive cutting of workpieces with considerable thickness variations.

The aforementioned uses are all characterized by considerable variations in the erosion process, due to great changes in the workpiece surfaces to be machined. These surface changes can extend over more than two levels and, without action on the part of the operator, necessarily lead to very long machining times or to damage to the electrode and workpiece through overloading. The purpose of the invention is to free the operator from continuous interventions in the process, whilst ensuring minimum machining times and optimum machining results.

It is known to control the spark erosive process as a function of machining surface changes. As early as 1969 Kondo found a possibility of drawing conclusions on the surface being machined during the process by measuring the discharge frequency and the division thereof by the length of feed. This method was published in Swiss Pat. No. 525,061. The control device used by Kondo encountered difficulties, which can only be overcome by periodic withdrawal motions of the sleeve and consequently efficiency reductions (column 26, lines 27 to 36 of Swiss Pat. No. 525,061).

In 1975, Languepin (DAS No. 2,505,944) proposed regulating the feed rate of the servo-system to a constant value of 0.3 to 0.4 mm/min by means of the generator power.

The Languepin constant feed rate control method is based on the assumption that erosion must take place with the same current density for large and small machining surfaces. However, in the case of large surface changes, this is just as incorrect as eroding at constant power, as in conventional erosion plants.

In 1977, Saito of Mitsubishi disclosed in Japanese Patent Application JP-OS No. 53-131.598/74 an erosion machine based on the wire cutting principle in which the electrical parameters can be set on the pulse generator as a function of the workpiece height by means of digital path control. Saito came up with the already known finding that within certain limits, there is a linear relationship between the power applied to the spark gap and the feed rate and that conclusions regarding the depth of cut can be drawn from this.

U.S. Pat. No. 4,071,729 describes a process control system which, in conventional manner, links the input data from an operator with the values at the working gap and carries out processing in accordance with a given programme. The function of this process control system is to maintain the machining state defined by the programme or the operator. However, there is no power adaptation in the case of changing machining surfaces of the workpiece and different machining conditions in the work gap.

None of the four publications refers to power adaptation, either in the case of changing machining surfaces or different machining types. However, without knowledge of these bases, it is impossible to realise a generally valid strategy for the automatic process control in the case of varying machining surfaces. Thus, machines controlled in accordance with these four publications would not be universally usable or adaptable to the process conditions. This is probably why such machines have not hitherto been widely commercially used.

The problem of the invention is to control the process in an optimum and automatic manner for any conceivable erosive machining type and in the case of varying machining surfaces on the basis of a generally valid control strategy.

According to the invention, this problem is solved in that the power p applied to the spark gap 10 is determined and is linked with the feed rate V via a generally valid control strategy and that by presetting a machining intensity a any degree of machining fineness can be selected and can be achieved in an optimum manner for any machining surface size.

The advantages of the invention are that such a process control system can be universally used for any spark erosive machining from microwire cutting to the coarsest countersinking. Spark erosive taper or conical cutting can be carried out in troublefree manner, as can the planetary countersinking of very angular or bevelled electrodes. As a result of the optimum power adaptation, apart from the higher cutting power during cutting, there is a more constant width of cut and wire cracks or fractures are virtually eliminated. In addition, better surface quality and lower electrode wear must be expected in countersinking, because partial overloads of the electrode are eliminated.

Embodiments of the invention, as well as graphs are shown in FIGS. 1 to 7 and are explained in greater detail hereinafter. In the drawings show:

FIG. 1 a graph and mathematical relationships of the universal control strategy.

Figure 2:
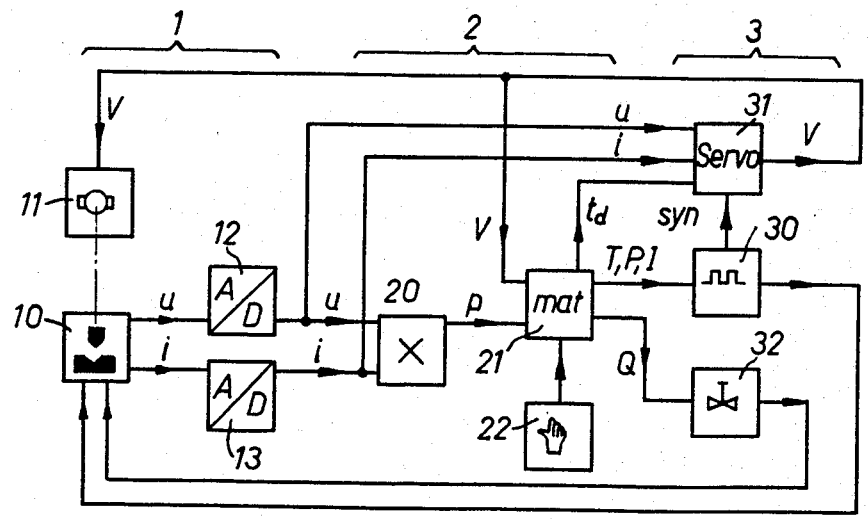

FIG. 2 circuit arrangement with direct determination of the power (p).

Figure 3:
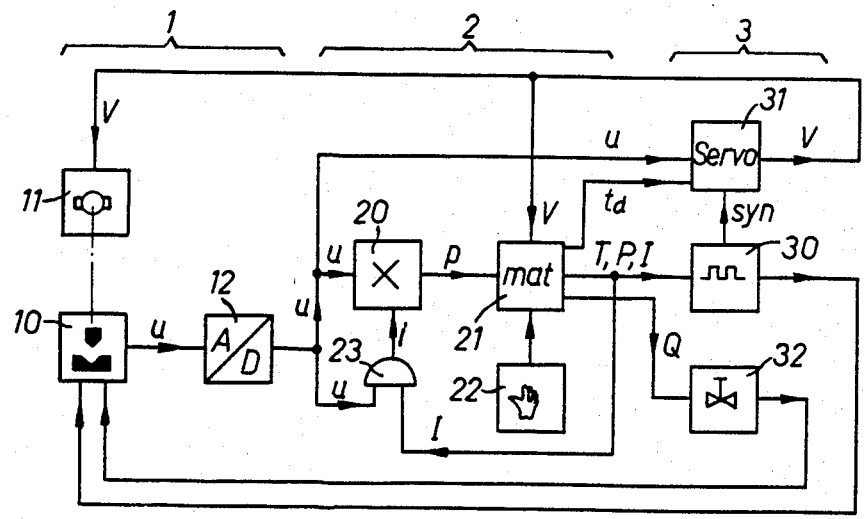

FIG. 3 circuit arrangement with determination of the power (p) without measuring the current (i).

Figure 4:
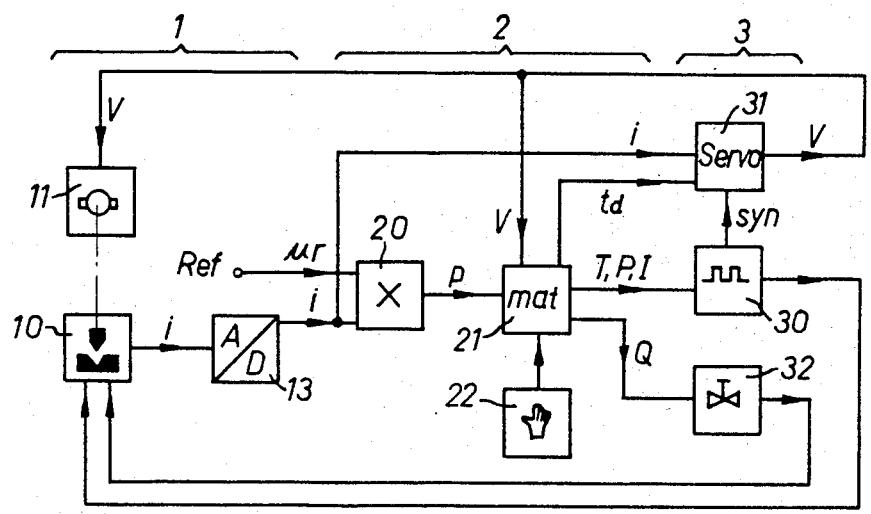

FIG. 4 circuit arrangement with determination of the power (p) without measuring the voltage (u).

Figure 5:
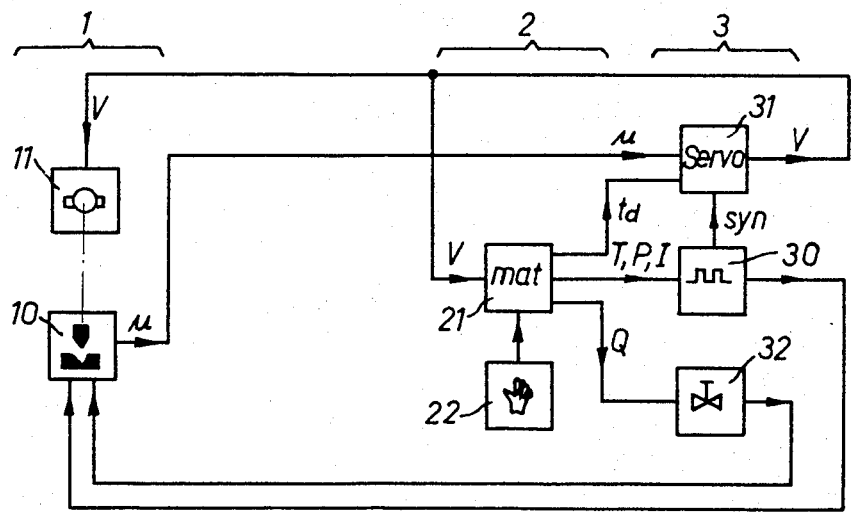

FIG. 5 circuit arrangement without determination of power (p) by measurement.

Figure 6:
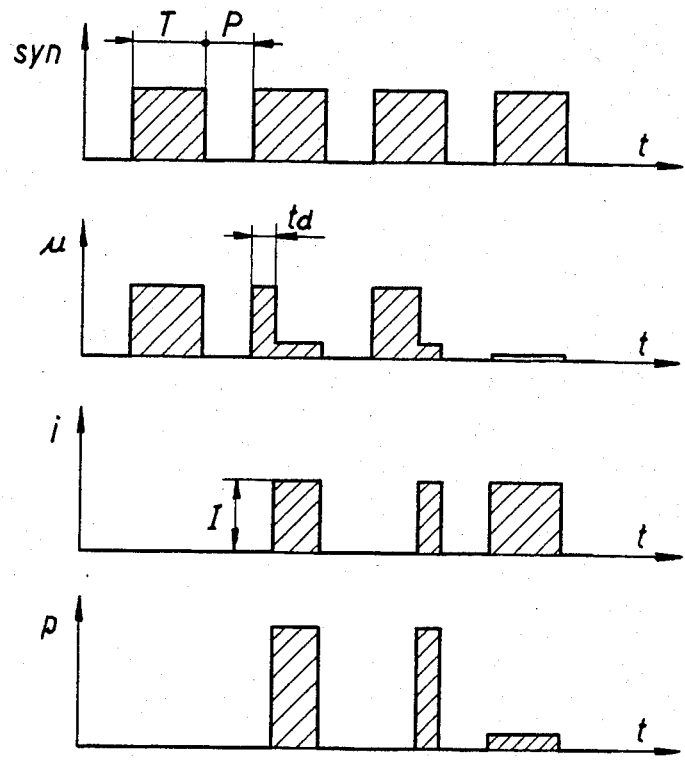

FIG. 6 time sequence of the most important signals.

Figure 7:
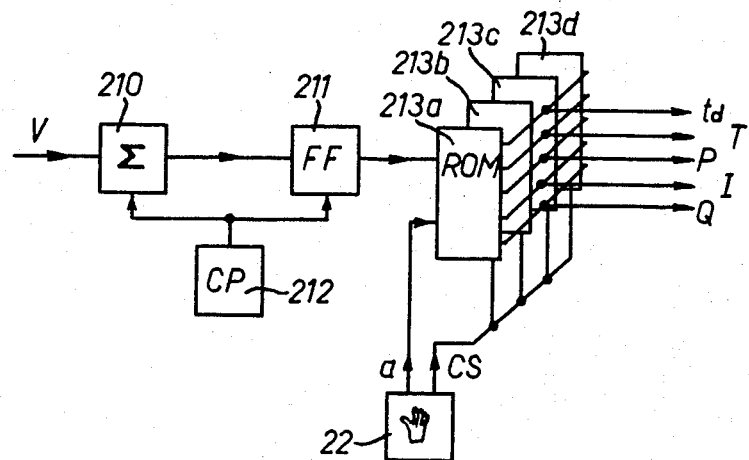

FIG. 7 circuit arrangement for the mathematical processor (21) without measuring power (p).

FIG. 1 is the fundamental graph for the control strategy, as well as its mathematical relationships.

As a result of the evaluation of a large number of tests, it was found that for each machining case the optimum control line between feed rate (V) and the power (p) applied to the spark gap is a straight line with a constant slope, if both variables (p and V) are in logarithmic scale to one another. This made necessary the introduction of a new and universal process parameter describing the parallel displacement of this control line. As this new parameter characterizes fine machining with a small value and coarse machining with a large value, it was called machining intensity. A machining intensity (a) of 1 to 6 occurs with wire cutting, whereas it can be about 12 for countersinking. The ranges of the power (p) can vary between 10 Watt and 100 Kilowatt and the feed rate between 0.01 mm/min and 100 mm/min. If the straight line for the machining intensity was horizontal in the graph, then the machining would always be performed with a constant power density in the case of a varying surface, i.e. with a constant power surface unit and consequently at a constant feed rate.

In conventional erosion plants, this line is perpendicular and the power density rises in a directly proportional manner with the feed rate (V). If here, the feed rate (V) is increased by e.g. two orders of magnitude, the power density is 100 times greater. Due to the slope of the line, in the case of optimum machining the power density is only increased by about 15.8 times when the feed rate (V) is increased by two orders of magnitude. The slope of the line is characterized by the factor 2.5 in mathematical relationships. This is the experimentally determined optimum value. It is obvious that this value may be varied within narrow limits without significantly impairing the result. The mathematical relationship is resolved in FIG. 1 according to all three variables. In each case, it is sufficient to have two variables to determine the third.

For the moment, a direct physical explanation of this mathematical relationship has not been found. However, it is obvious that the smaller the surface to be eroded, the better it is possible to remove the resulting process heat, erosion particles and process gas from the erosion zone. Thus, a small surface may not be loaded with the same power (p) as a larger surface, but can receive a higher power density.

FIG. 2 shows a first embodiment of a spark erosion plant operating according to the novel control method. The plant comprises erosion machine 1, process control system (2) and power part (3). Erosion machine (1) has a servo-drive (11) which moves relative to one another one or both electrodes of spark gap (10). In addition, there are not further explained measuring devices for current (i) and voltage (u). These measured values are converted into digital form by in each case one analog-digital converter (12, 13) and transferred to the process control system (2) and power part (3). The analog-digital converters must have a band width of at least 10 Mhz, such as e.g. product SDA 5010 of SIEMENS, Germany or TDC 1014 of TRW, California, USA or UAB 1005 of THOMSON, France.

The servo-control system (31) of power part (3) receives the digital signals of current (i) and voltage (u) from analog-digital converters (12, 13), as well as a synchronizing signal (syn) from pulse generator (30) and a desired value signal for the average ignition delay ($t_d$) from mathematical processor (21). Various methods are known in order to derive the feed rate (V) from this information and in this way to keep the process constantly at the average predetermined ignition delay ($t_d$). Normally, the servo-control system has further detectors, e.g. for harmful stationary discharges or for short-circuits, together with devices for the rapid retraction and re-advance of the electrode. As an example of such a servo-control system, (31), reference is made to the arrangement by Köhler described in detail in DAS No. 2,214,790.

The multiplier (20) of the process control system (2) also receives the digital signals of current (i) and voltage (u). The product of the two signals is continuously formed therefrom and constantly corresponds to the power (p) at spark gap (10).

According to a preferred embodiment, this multiplier (20) comprises a read-only memory (ROM), e.g. product SN 54 S 472 of TEXAS INSTRUMENTS, Dallas, USA. This component has 9 address inputs and 8 data outputs. The storable data quantity is therefore 512 times 8 bits. Thus, in this case, e.g. 4 bits of the address inputs can be used for the voltage information (u), which would correspond e.g. to an analog voltage range of 20 to 50 V in the case of a resolution of 2 V. The remaining 5 bits of the address inputs would then be used e.g. for an analog current range of 0 to 62 A with a 2 A resolution. The power range is then 0 to 3100 W with a possible resolution of 8 bits or approximately 12 W.

Each of these 8 bit data stores can be called up by an address combination and this data content then appears at the output. The data content is programmed in such a way that it corresponds to the product, or in certain circumstances the logarithm of the product, of current (i) times voltage (u).

Thus, in this example, each storage location is occupied by the product of the first 4 bits times the remaining 5 bits of its address. Thus, for this example, a typical multiplication time of 55 nanoseconds is to be expected, independently of the values for current (i) and voltage (u).

The mathematical processor (21) receives the digital signal of power (p) and the digital signal or optionally the signal digitized by means of an analog-digital converter of the feed rate (V). The mathematical processor (21) is also conncted to an input unit (22). This input unit (22) can be a keyboard, selector switch or tape reader. This input unit (22) informs the erosion plant of which type of erosion machining has to be carried out under boundary conditions. By means of this information, the process is stated with a preprogrammed start-process parameter combination ($t_d$, T, P, I, Q). The mathematical processor (21) now immediately starts to interrogate the data inputs for power (p) and feed rate (V) and to form their mean values over a matched period of time. The latter must be adapted to the process parameter pulse time (T) and pause time (P) in order not to initiate control processes following the timing frequency of pulse generator (30).

In any case, the averaging should be approximately 3 times slower than the timing frequency of pulse generator (30). A microprogramme is then run in stepwise manner, but no further reference will be made to this here. The existing machining intensity (a) is determined according to the first equation in FIG. 1 and compared with the desired machining intensity (a) preset by means of input unit (22). Depending on whether the result is larger, smaller or the same, it is now known whether one is positioned to the right, left or on the desired line in the graph of FIG. 1. An optionally modified process parameter combination ($t_d$, T, P, I, Q) can now be fed out. This is generally carried out in such a way that individual parameters ($t_d$, T, P, I, Q) per control pass are modified by max. 1 step, whereas others are changes by max. 1 step every second or third control pass. However, in preprogrammed conditions, known from experience, the modified process parameter combination ($t_d$, T, P, I, Q) can be fed out new for each control pass. It is important that the determined machining intensity (a) converges with the predetermined desired value after a few control passes, so that the first equation of FIG. 1 is satisfied as quickly as possible, but is not overfulfilled, because this would otherwise lead to continual control oscillations.

For different machining types, it is generally necessary to preprogramme varying parameter adaptation strategies, which can generally only be determined by tests.

As for example, when cutting wire over different workpiece heights, the requirement exists that the width of cut remains constant. A reduction of the pause time (P) leads to a widening of the width of cut. A shortening of the average ignition delay ($t_d$) also leads to an increase in the power (p), but to a narrowing of the width of cut. It is obvious that in this case these two parameters must be jointly modified, which has a compensating effect on the width of cut.

When countersinking, there are also physical conditions in relationships concerning the removal rate, electrode wear and surface quality. In this connection, reference is made to the appropriate literature, e.g. the thesis of Dr. B. Schumacher, Aachen Technical University 1966 "The power behaviour and tool wear in spark erosive machining of steel with storage and pulse generators".

According to the invention, the dielectric scavenging quantity (Q) is adapted in a manner proportional to the determined average power (p). This can be derived from the consideration that there is a constant contamination in the machining zone, and the fact that the erosion particles, process heat and process gas are produced in an approximately proportional quantity to power (p).

The electric regulator (32) preferably comprises an electrical stepping motor coupled with a leak-free proportioning pump, e.g. a hose compression pump. Compared with a mechanical flow regulator with servodrive, such a construction has the advantage of a simple and very accurate control by means of the stepping frequency, with a possible control range of more than 3 orders of magnitude.

According to a preferred embodiment, the mathematical processor (21) comprises a single-chip microprocessor, i.e. a microprocessor integrated into a single module, e.g. product 8751 of INTEL, Santa Clara, Calif., USA. It is possible to control approximately 2000 complete control passes of the described type per second by means thereof.

It must obviously be possible to connect pulse generator (30) to an automatic control system. Control knobs are replaced by electrical desired value inputs. Such a generator is described e.g. in DAS No. 2,547,767.

FIG. 3 shows a similar erosion plant, with the difference that the current (i) is determined from process parameter (I), i.e. its desired value and not by means of a measurement. Account must be taken of the individual ignition delay ($t_d$) of each pulse and the desired value (I) is only allowed to pass through multiplier (20) if there has been a discharge. This can only be determined byy means of the digital output of the digital-analog converter (12). Gate (23) can e.g. be activated as soon as the digital value (u) is smaller than the maximum possible value, i.e. digital information differing e.g. from H H H H.

FIG. 4 shows another possible embodiment of such an erosion plant. In this case, only current (i) is measured and is used as process information for the servo-control (31) and multiplier (20). In multiplier (20), current (i) is multiplied by a constant value, the reference voltage (ur), corresponding to an empirical value of the spark burning voltage of approximately 25 V. Although in the case of a short-circuit, this leads to excessive values for power (p), it constitutes an insignificantly brief evaluation error, because such a short-circuit is immediately eliminated by the servo-control (31).

An embodiment of the type shown in FIG. 5 is particularly intended for older erosion plants, which have to be reequipped with the process control system. Unlike in the previously described embodiments, the process is controlled here by means of an open control loop for power (p). In other words, the process is not regulated but controlled.

In this case, mathematical processor (20) only receives the information on the existing feed rate (V) from servo-control (31) and the value for the desired machining intensity (a) from input unit (22).

However, it is no longer possible on the basis of the first equation of FIG. 1 to calculate the existing machining intensity (a) and make a comparison with the desired machining intensity (a). However, it is possible to calculate a desired value (p) on the basis of the third equation of FIG. 1 and consequently to close the control loop internally in mathematical processor (21).

The only problem is to supply corresponding combinations for the process parameters ($t_d$, T, P, I, Q) as mathematical processor (21) providing the calculated power (p) at spark gap (10).

FIG. 6 reproduces in exemplified manner the time sequence for synchronizing signal (syn), voltage (u), current (i) and power (p). In addition, the process parameters pulse time (T), pause time (P), ignition delay ($t_d$) and pulse current (I) are shown. It is apparent that the momentary power (p) can be calculated from the pulse current (I) times the experience-based voltage (u) of approximately 25 V.

For the power (p) averaged by means of pulse time (T), the momentary power (p) times the difference of the pulse time (T), minus the average ignition delay ($t_d$), divided by the pulse time (T), and for the average power (p) over period (T+P), the power (p) averaged over pulse time (T) times the latter and divided by the sum of pulse time (T) plus the pause time (P) are calculated. Thus, clear forecasts can be made regarding the average expected power from a parameter combination ($t_d$, T, P, I, Q).

FIG. 7 shows an embodiment for the mathematical processor (21), which takes a logical account of these possible forecasts. This embodiment is also particularly suitable for older erosion plants. It is assumed that in the case of such a plant, the feed rate (V) is present in the form of a feed cycle of e.g. 1 cycle per micrometer and one feed direction signal. These two signals are fed to the counting inputs of a counter (210), where they are summated on the basis of the direction. After a time interval determined by a timing generator (212) the counter reading is stored in an intermediate store (211) and then counter (210) is reset. The average feed rate (V) brought into digital form in this way is then fed into first address inputs of one or more read-only memories (213). If in the case of such an erosion plant, the feed rate (V) was only present in the form of an analog voltage, it could be supplied by means of an analog-digital converter to the same first address inputs. In the case, counter (210), timing generator (212) and intermediate store (211) can be omitted.

The signal for the desired machining intensity (a) is supplied to second address inputs of the ROM (213) from input unit (22). For each address combination the storage locations of the ROM (213) contain a process parameter combination ($t_d$, T, P, I, Q), which firstly corresponds to the technological requirements of the erosion work to be carried out, secondly complies with the aforementioned relationships for the average power (p) to be expected and thirdly corresponds to the combination of the first and second address inputs according to the third equation in FIG. 1.

The technological requirements are now largely known from the documentation supplied by the various spark erosion machine manufacturers. Thus, for example, the same ROM modules can be used, as proposed hereinbefore, for multiplier (20). If an 8 bit data output is not sufficient to transcribe the process parameter combination ($t_d$, T, P, I, Q), it is possible to operate in parallel a random number of such modules with parallel address inputs. Using the same method, it is possible, to preprogramme different parameter combinations for different machining types. The corresponding ROM (213a or 213b or 213c or 213c) can be activated by means of a chip select input, i.e. a module selection input. By means of input unit (22) and a line (CS), it is possible to preset the machining type, e.g. the matching of the materials and whether machining is to take place so that a large or small amount of material is removed.

Only digital signal processing has been proposed, but it is obvious that all the calculations and comparisons can be simulated with analog circuits. However, they are not preferred embodiments of the invention, because for cost and fault-freedom reasons an analog circuit can hardly be operated over a range wider than 2 orders of magnitude.

I claim:

1. Method for automatic process control of a spark erosion machine having a spark gap defined by a tool surface and a work piece surface under varying process conditions in the spark gap caused by changes of the area of the work piece surface to be machined and wherein the power at the spark gap during the erosion process is adjustable in response to a change in at least one process parameter, said method comprising the steps of adjusting a relative feed rate between said tool and work piece surfaces in response to a servo-control system so that erosion takes place with a predetermined average ignition delay; providing a value of the electrical power at the spark gap; calculating a predetermined linear combination of the logarithm of the feed rate and the logarithm of the power to form a value for the actual machining intensity; providing a value for a desired machining intensity; comparing the values of actual and desired maching intensity; and controlling at least one process parameter to bring the actual machining intensity into conformity with the desired machining intensity.

2. Method for automatic process control according to claim 1 wherein said linear combination is the sum of the logarithm of the feed rate plus approximately 2.5 times the logarithm of the power.

3. Method for automatic process control according to claim 1 further comprising the step of providing a value for at least one of the voltage and current at the spark gap and wherein the power is calculated on the basis of such at least one value.

4. Method for automatic process control according to claim 3 wherein a value of the voltage measured at the spark gap is provided and a value representative of the desired machining current at the spark gap is provided only when said voltage exceeds a predetermined threshold value.

5. Method for automatic process control according to claim 3 wherein a value of the current measured at the spark gap is provided and a voltage reference value representative of the empirical spark burning voltage at the spark gap is provided.

6. Method for automatic process control of a spark erosion machine having a spark gap defined by a tool surface and a work piece surface under varying process conditions in the spark gap caused by changes of the area of the work piece surface to be machined and wherein the power at the spark gap during the erosion process is adjustable in response to a change in at least one process parameter, said method comprising the steps of adjusting a relative feed rate between said tool and work piece surfaces in response to a servo-control system so that erosion takes place with a predetermined average ignition delay; providing a value representative of a preselected desired machining intensity; and selectively implementing one of a number of combinations of values of said at least one process parameter in response to the feed rate to establish an average electrical power at the spark gap, where a predetermined linear combination of the logarithm of the feed rate and the logarithm of the power approximates the desired machining intensity.

7. Method for automatic process control according to claim 6 wherein said linear combination is the sum of the logarithm of the feed rate plus approximately 2.5 times the logarithm of the power.

8. Method for automatic process control of a spark erosion machine according to any one of the claims 1–7, including the step of regulating the flow rate of a dielectric scavenging fluid in approximate proportion to said power.

9. Method for automatic process control in accordance with any one of claims 1, 4 and 5, wherein said controlling step further comprises forming the average values for the power and feed rate over a predetermined time period; forming the logarithm of each of said average values; calculating a predetermined linear combination of the logarithm of the feed rate and the logarithm of the power, and comparing the resulting calculated value with the desired machining intensity vaue; and, responsive to a difference between said resulting calculated value and said desired value, modifying at least one process parameter to reduce said difference.

10. Method for automatic process control in accordance with claim 6 where said spark erosion machine further comprises memory means having stored therein combinations of predetermined values of said at least one process parameter representative of values of average electrical power at the spark gap, said controlling step further comprising forming the average value for the feed rate over a predetermined time period; supplying said values for the average feed rate and preselected machining intensity to inputs of said memory means; and receiving from the output of said memory means a combination of values of said at least one process parameter such that a linear combination of the logarithm of the average feed rate and the logarithm of the average power represented by the received combination of process parameter values approximates said preselected machining intensity value.

11. Method for automatic process control in accordance with claim 10 where said memory means comprises a memory corresponding to each of a plurality of different machining types and storing combinations of predetermined values of process parameters adjusted for the corresponding machining type, said controlling step further comprising providing a signal representative of a predetermined machining type and selecting a memory of said memory means corresponding to said predetermined machining type.

12. Method for automatic process control of a spark erosion machine having a spark gap defined by a tool surface and a work piece surface and wherein the electrical power at the spark gap during the erosion process is adjustable in response to a change in at least one process parameter, said method comprising the steps of adjusting a relative feed rate between said tool and work piece surfaces in response to a servo-control system, providing a value of the electrical power at the spark gap, and controlling at least one process parameter so that a predetermined linear combination of the logarithm of the feed rate and the logarithm of the power approximates a predetermined machining intensity value.

13. A spark erosion machine having a spark gap defined by a tool surface and a work piece surface and wherein the power at the spark gap during the erosion process is adjustable in response to a change in at least one process parameter, said spark erosion machine further comprising a servo-control means for adjusting a relative feed rate between said tool and work piece surfaces; means for calculating a value representative of the electrical power at the spark gap; means for providing a value for a predetermined desired machining intensity; and means responsive to said calculated power for controlling at least one process parameter so that a predetermined linear combination of the logarithm of the feed rate and the logarithm of the power approximates the predetermined machining intensity value.

14. A spark erosion machine according to claim 15, said means for calculating power further comprising means for providing values representative of the voltage and current at the spark gap and memory means connected to said controlling means and responsive to said voltage and current values for providing a value for power representative of the product of said voltage and current values.

* * * * *